US010455549B2

(12) United States Patent
Sebire et al.

(10) Patent No.: US 10,455,549 B2
(45) Date of Patent: Oct. 22, 2019

(54) CONTROL OF RESOURCES

(71) Applicant: Nokia Solutions and Networks Oy, Espoo (FI)

(72) Inventors: Benoist Pierre Sebire, Tokyo (JP); Hai Tao Li, Beijing (CN); Jarkko Tuomo Koskela, Oulu (FI); Yang Liu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/899,657

(22) PCT Filed: Jun. 25, 2013

(86) PCT No.: PCT/EP2013/063182
§ 371 (c)(1),
(2) Date: Dec. 18, 2015

(87) PCT Pub. No.: WO2014/206445
PCT Pub. Date: Dec. 31, 2014

(65) Prior Publication Data
US 2016/0150502 A1 May 26, 2016

(51) Int. Cl.
*H04W 72/04* (2009.01)
*H04W 76/15* (2018.01)
*H04W 36/00* (2009.01)
*H04W 76/27* (2018.01)
(Continued)

(52) U.S. Cl.
CPC .......... *H04W 72/04* (2013.01); *H04W 28/16* (2013.01); *H04W 36/0069* (2018.08); *H04W 76/10* (2018.02); *H04W 76/15* (2018.02); *H04W 76/27* (2018.02)

(58) Field of Classification Search
CPC ... H04W 76/02; H04W 76/025; H04W 88/06; H04W 72/042; H04W 72/0413; H04W 76/046
See application file for complete search history.

(56) References Cited

U.S. PATENT DOCUMENTS

2012/0002614 A1* 1/2012 Ekici .................. H04W 48/18
370/329
2016/0044540 A1* 2/2016 He ...................... H04W 76/00
370/237
(Continued)

FOREIGN PATENT DOCUMENTS

KR  10-2013-0053357  *  5/2013

OTHER PUBLICATIONS

3GPP TSG-RAN WG2 #82, Fukuoka, Japan, May 20-24, 2013, R2-131672, "Impact of small cell enhancements to RRC functions", Ericsson, ST-Ericsson, 6 pgs.
(Continued)

*Primary Examiner* — Nam T Huynh
(74) *Attorney, Agent, or Firm* — Harrington & Smith

(57) ABSTRACT

A method including receiving information at an apparatus; and using said information for configuration of a radio resource control connection of said apparatus with a first node controlling a first cell and a second node controlling a second cell; and wherein said configuration of a radio resource control connection is made in dependence on a capability of said apparatus.

44 Claims, 5 Drawing Sheets

(51) Int. Cl.
H04W 28/16 (2009.01)
H04W 76/10 (2018.01)

(56) References Cited

U.S. PATENT DOCUMENTS

2016/0057668 A1* 2/2016 Lee .................. H04W 48/20
370/331
2016/0066241 A1* 3/2016 Wu .................. H04W 36/28
370/331

OTHER PUBLICATIONS

3GPP TSG-RAN WG2 #82, Fukuoka, Japan, May 20-24, 2013, R2-131934, "TP related to email discussion [81bis#18] [LTE/SCE-HL] CP protocol and architecture alternatives", Ericsson, 6 pgs.

* cited by examiner

CONTROL OF RESOURCES

This application relates to the configuration of radio resources.

A communication system can be seen as a facility that enables communication sessions between two or more nodes such as fixed or mobile communication devices, access points such as base stations, servers, machine type servers, routers, and so on. A communication system and compatible communicating devices typically operate in accordance with a given standard or specification which sets out what the various entities associated with the system are permitted to do and how that should be achieved. For example, the standards, specifications and related protocols can define the manner how communication devices shall communicate with the access points, how various aspects of the communications shall be implemented and how the devices and functionalities thereof shall be configured.

A user can access the communication system by means of an appropriate communication device. A communication device of a user is often referred to as user equipment (UE) or terminal.

Signals can be carried on wired or wireless carriers. Examples of wireless systems include public land mobile networks (PLMN), satellite based communication systems and different wireless local networks, for example wireless local area networks (WLAN). Wireless systems can be divided into coverage areas referred to as cells, such systems being often referred to as cellular systems. A cell can be provided by a base station, there being various different types of base stations. Different types of cells can provide different features. For example, cells can have different shapes, sizes, functionalities and other characteristics. A cell is typically controlled by a control node.

A communication device is provided with an appropriate signal receiving and transmitting arrangement for enabling communications with other parties. In wireless systems a communication device provides a transceiver station that can communicate with another communication device such as e.g. a base station and/or another user equipment. A communication device such as a user equipment (UE) may access a carrier provided by a base station, and transmit and/or receive on the carrier. Before data can be transferred between user equipment and a base station, configuration of necessary entities is needed. Typically a cell specific configuration, a UE specific configuration and a bearer specific configuration for each active UE bearer should be communicated between eNB and UE.

An example of cellular communication systems is an architecture that is being standardized by the 3rd Generation Partnership Project (3GPP). A recent development in this field is often referred to as the long-term evolution (LTE) of the Universal Mobile Telecommunications System (UMTS) radio-access technology. In LTE base stations providing the cells are commonly referred to as enhanced NodeBs (eNB). An eNB can provide coverage for an entire cell or similar radio service area.

Cells can provide different service areas. For example, some cells may provide wide coverage areas while some other cells provide smaller coverage areas. The smaller radio coverage areas can be located wholly or partially within a larger radio coverage area. For example, in LTE a node providing a relatively wide coverage area is referred to as a macro eNode B. Examples of nodes providing smaller cells, or local radio service areas, include femto nodes such as Home eNBs (HeNB), pico nodes such as pico eNodeBs (pico-eNB) and remote radio heads.

A device may communicate with more than one cell. Communications with more than one cell may be provided e.g. to increase performance. A way of providing this could be, for example, based on carrier aggregation (CA). In carrier aggregation a plurality of carriers are aggregated to increase bandwidth. Carrier aggregation comprises aggregating a plurality of component carriers into a carrier that can be referred to as an aggregated carrier.

LTE-Advanced is an example of a system capable of providing carrier aggregation. In LTE-A two or more component carriers (CCs) can be aggregated in order to support wider transmission bandwidths and/or for spectrum aggregation. Currently it is envisaged that the bandwidths can extend up to 100MHz. Depending on its capabilities, it is possible to configure a user equipment (UE) to aggregate a different number of component carriers either from the same frequency band or different ones. A primary component carrier can be provided by a primary cell (PCell) whereas further carriers can be provided by at least one secondary cell (SCell). SCells form together with the PCell a set of serving cells. To enable reasonable battery consumption by the user equipment when aggregating carriers, an activation/deactivation mechanism of SCells is supported. When operated to provide CA a user equipment (UE) is configured with a primary cell (PCell). The PCell is used for taking care of security, Non-Access-Stratum (NAS) protocol mobility, and transmission of physical uplink control channel (PUCCH). All other configured CCs are called secondary cells (SCells).

Inter-site carrier aggregation has also been proposed. For example, it has been proposed that smaller cells could be used in conjunction with macro cells. In dual connectivity, a UE is connected to a macro cell and a small cell simultaneously. An aim of dual connectivity is to decrease mobility related signalling load towards the core network as well as to benefit from gains by the inter-site carrier aggregation for scheduling flexibility and user throughput. In some aspects dual connectivity is rather similar to CA with the macro cell serving as PCell and the small cells being SCells. However, in dual connectivity different eNBs provide the PCell and the sCell(s) as opposed to only one eNB according to e.g. 3GPP LTE Releases 10 and 11.

Embodiments of the invention aim to address one or several of the issues that reside in the scenario of inter-site CA or any kind of dual connectivity.

In a first aspect there is provided a method comprising: receiving information at an apparatus; and using said information for configuration of a radio resource control connection of said apparatus with a first node controlling a first cell, and a radio resource control connection of said apparatus with a second node controlling a second cell; and wherein said configuration of a radio resource control connection is made in dependence on a capability of said apparatus.

Preferably said first cell comprises one of a macro-cell and a small cell, and the second cell comprises the other of said macro-cell and a small-cell.

Preferably said information comprises an instruction received from at least one of said first and second nodes to apply said configuration.

Preferably said method comprises transmitting said capability of said apparatus to at least one of said first node and said second node.

Preferably said method comprises applying said configuration at said apparatus when it is determined that said configuration is in accordance with said capability of said apparatus.

Preferably said method comprises not applying said configuration when it is determined that said configuration is not in accordance with said capability of said apparatus.

Preferably said method comprises sending a message to at least one of said first and second nodes indicating that a configuration can not be applied if it is outside the capability of the apparatus.

Preferably said information is received from at least one of said first and second nodes.

Preferably said apparatus is configured to prioritise information received from one of said first and second nodes.

Preferably said apparatus is configured to prioritise information that is first received from either of said first and second nodes.

Preferably said apparatus is configured to indicate its capability.

Preferably said capability comprises at least one of physical capability and software capability of said apparatus.

Preferably said apparatus comprises a user equipment.

In a second aspect there is provided a computer program comprising computer executable instructions which when run on one or more processors perform the method of the first aspect.

In a third aspect there is provided an apparatus comprising at least one processor; and at least one memory including computer program code; the at least one memory and the computer program code configured to, with the at least one processor, cause the apparatus at least to: receive information; and use said information for configuration of a radio resource control connection of said apparatus with a first node controlling a first cell, and a radio resource control connection of said apparatus with a second node controlling a second cell; and wherein said configuration of a radio resource control connection is made in dependence on a capability of said apparatus.

Preferably said first cell comprises one of a macro-cell and a small cell, and the second cell comprises the other of said macro-cell and a small-cell.

Preferably said information comprises an instruction received from at least one of said first and second nodes to apply said configuration.

Preferably said apparatus is configured to transmit said capability of said apparatus to at least one of said first node and said second node.

Preferably said apparatus is configured to apply said configuration when it is determined that said configuration is in accordance with said capability of said apparatus.

Preferably said apparatus is configured to not apply said configuration when it is determined that said configuration is not in accordance with said capability of said apparatus.

Preferably said apparatus is configured to send a message to at least one of said first and second nodes indicating that a configuration cannot be applied if it is outside the capability of the apparatus.

Preferably said apparatus is configured to receive said information from at least one of said first and second nodes.

Preferably said apparatus is configured to prioritise information received from one of said first and second nodes.

Preferably said apparatus is configured to prioritise information that is first received from either of said first and second nodes.

Preferably wherein said apparatus is configured to indicate its capability.

Preferably said capability comprises at least one of physical capability and software capability of said apparatus.

Preferably said apparatus comprises a user equipment.

In a fourth aspect there is provided an apparatus comprising means for receiving information; and means for using said information for configuration of a radio resource control connection of said apparatus with a first node controlling a first cell, and a radio resource control connection of said apparatus with a second node controlling a second cell; and wherein said configuration of a radio resource control connection is made in dependence on a capability of said apparatus.

Preferably said first cell comprises one of a macro-cell and a small cell, and the second cell comprises the other of said macro-cell and a small-cell.

Preferably said information comprises an instruction received from at least one of said first and second nodes to apply said configuration.

Preferably said apparatus comprises means for transmitting said capability of said apparatus to at least one of said first node and said second node.

Preferably said apparatus comprises means for applying said configuration when it is determined that said configuration is in accordance with said capability of said apparatus.

Preferably said apparatus comprises means for not applying said configuration when it is determined that said configuration is not in accordance with said capability of said apparatus.

Preferably said apparatus comprises means for sending a message to at least one of said first and second nodes indicating that a configuration cannot be applied if it is outside the capability of the apparatus.

Preferably said apparatus is configured to receive said information from at least one of said first and second nodes.

Preferably said apparatus comprises means for prioritising information received from one of said first and second nodes.

Preferably said apparatus comprises means for prioritising information that is first received from either of said first and second nodes.

Preferably said apparatus comprises means for indicating its capability.

Preferably said capability comprises at least one of physical capability and software capability of said apparatus.

Preferably said apparatus comprises a user equipment.

In a fifth aspect there is provided a method comprising: transmitting information from a first apparatus to a user equipment, said information for configuration of a radio resource control connection of said user equipment with said first apparatus and a radio resource control connection of said user equipment with a second apparatus, and wherein said first apparatus controls one of a first cell and a second cell, and the second apparatus controls the other of said first cell and said second cell; and wherein said configuration of a radio resource control connection is made in dependence on a capability of said user equipment.

Preferably said first cell comprises one of a macro-cell and a small cell, and the second cell comprises the other of said macro-cell and a small cell.

Preferably said information comprises an instruction to apply said configuration.

Preferably said method comprises receiving at said first apparatus a message indicating that said configuration has been successfully applied.

Preferably said method comprises receiving at said first apparatus a message indicating that said configuration has not been applied when said configuration is not in accordance with said user equipment capability.

Preferably said method comprises receiving user equipment capability information from said user equipment.

Preferably said method comprises receiving user equipment capability information from a mobile management entity.

Preferably said method comprises transmitting to or receiving from said second apparatus information regarding said capability of said user equipment.

Preferably said method comprises transmitting to or receiving from said second apparatus a message indicating that said configuration has been successfully applied.

Preferably said capability comprises at least one of physical capability and software capability of said user equipment.

Preferably said first apparatus comprises a base station.

In a sixth aspect there is provided a computer program comprising computer executable instructions which when run on one or more processors perform the method the fifth aspect.

In a seventh aspect there is provided an apparatus comprising at least one processor; and at least one memory including computer program code; the at least one memory and the computer program code configured to, with the at least one processor, cause the apparatus at least to: transmit information to a user equipment, said information for configuration of a radio resource control connection of said user equipment with said apparatus and a radio resource control connection of said user equipment with a second apparatus, and wherein said apparatus controls one of a first cell and a second cell, and the second apparatus controls the other of said first cell and said second cell; and wherein said configuration of a radio resource control connection is made in dependence on a capability of said user equipment.

Preferably said first cell comprises one of a macro-cell and a small cell, and the second cell comprises the other of said macro-cell and a small cell.

Preferably said information comprises an instruction to apply said configuration.

Preferably said apparatus is configured to receive a message indicating that said configuration has been successfully applied.

Preferably said apparatus is configured to receive a message indicating that said configuration has not been applied when said configuration is not in accordance with said user equipment capability.

Preferably said apparatus is configured to receive user equipment capability information from said user equipment.

Preferably said apparatus is configured to receive user equipment capability information from a mobile management entity.

Preferably said apparatus is configured to transmit to or receive from said second apparatus information regarding said capability of said user equipment.

Preferably said apparatus is configured to transmit to or receive from said second apparatus a message indicating that said configuration has been successfully applied.

Preferably said capability comprises at least one of physical capability and software capability of said user equipment.

Preferably said apparatus comprises a base station.

In an eighth aspect there is provided an apparatus comprising means for transmitting information to a user equipment, said information for configuration of a radio resource control connection of said user equipment with said apparatus and a radio resource control connection of said user equipment with a second apparatus, and wherein said apparatus controls one of a first cell and a second cell, and the second apparatus controls the other of said first cell and said second cell; and wherein said configuration of a radio resource control connection is made in dependence on a capability of said user equipment.

Preferably said first cell comprises one of a macro-cell and a small cell, and the second cell comprises the other of said macro-cell and a small cell.

Preferably said information comprises an instruction to apply said configuration.

Preferably said apparatus comprises means for receiving a message indicating that said configuration has been successfully applied.

Preferably said apparatus comprises means for receiving a message indicating that said configuration has not been applied when said configuration is not in accordance with said user equipment capability.

Preferably said apparatus comprises means for receiving user equipment capability information from said user equipment.

Preferably said apparatus comprises means for receiving user equipment capability information from a mobile management entity.

Preferably said apparatus comprises means for transmitting to or receiving from said second apparatus information regarding said capability of said user equipment.

Preferably said apparatus comprises means for transmitting to or receiving from said second apparatus a message indicating that said configuration has been successfully applied.

Preferably said capability comprises at least one of physical capability and software capability of said user equipment.

Preferably said apparatus comprises a base station.

Some embodiments will now be described, by way of example only, with respect to the following Figures in which.

In the following certain exemplifying embodiments are explained with reference to a wireless or mobile communication system serving mobile communication devices. Before explaining in detail the exemplifying embodiments, certain general principles of a wireless communication system and nodes thereof and mobile communication devices are briefly explained with reference to FIGS. 1 to 5 to assist in understanding the context of the described examples.

A non-limiting example of the recent developments in communication system architectures is the long-term evolution (LTE) of the Universal Mobile Telecommunications System (UMTS) that is being standardized by the 3rd Generation Partnership Project (3GPP). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). WLANs are sometimes referred to by WiFi™, a trademark that is owned by the Wi-Fi Alliance, a trade association promoting Wireless LAN technology and certifying products conforming to certain standards of interoperability.

Figure 1:
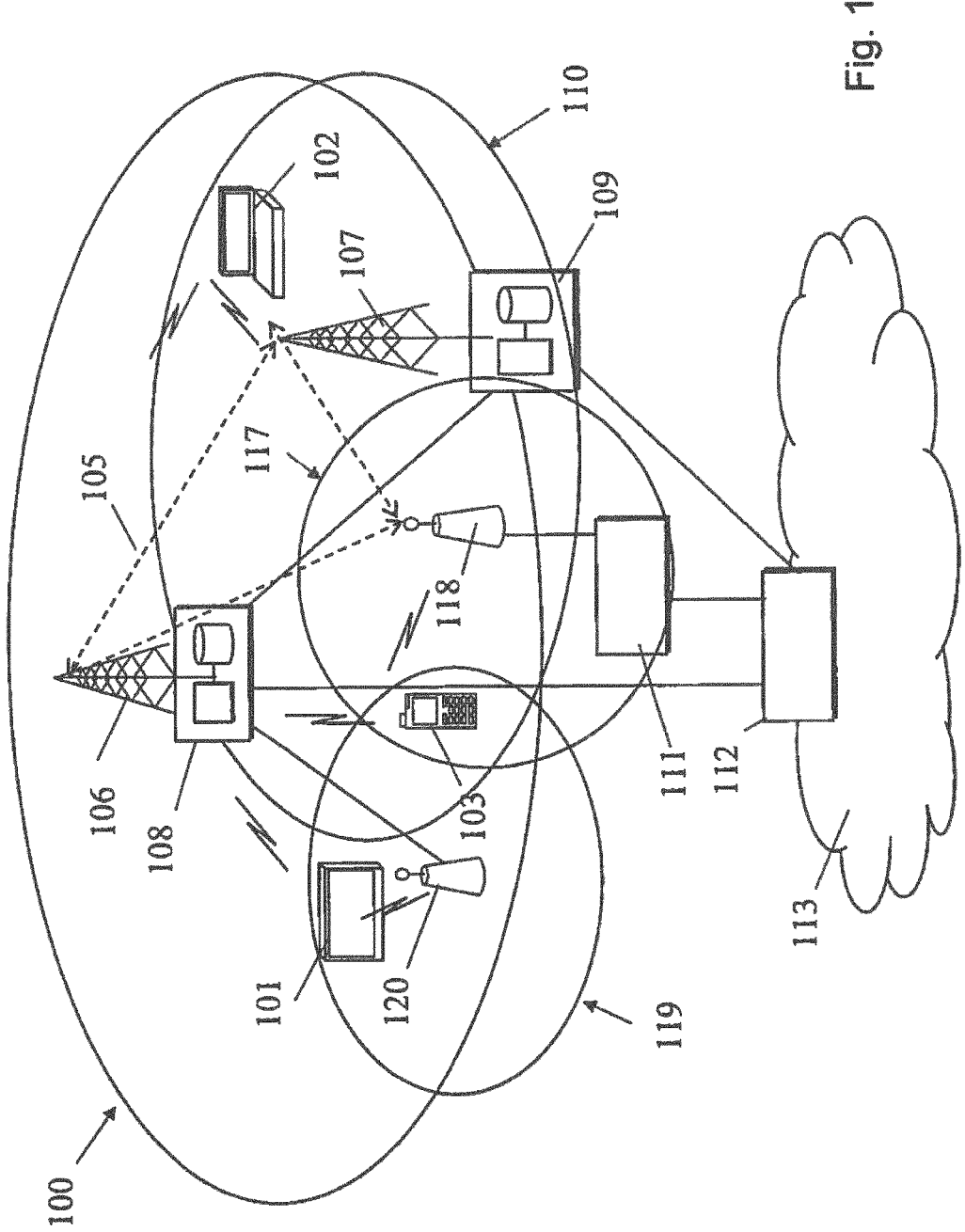
FIG. 1 shows a schematic diagram of a network according to some embodiments.

Different types of communication devices 101, 102, 103 can be provided wireless access via base stations or similar wireless transmitter and/or receiver nodes providing radio service areas or cells. In FIG. 1 different neighbouring and/or overlapping radio service areas or cells 100, 110, 117 and 119 are shown being provided by base stations 106, 107, 118 and 120. It is noted that the cell borders are schematically shown for illustration purposes only in FIG. 1. It shall be understood that the sizes and shapes of the cells or other radio service areas may vary considerably from the omni-directional shapes of FIG. 1. A base station site can provide one or more cells or sectors, each sector providing a cell or a subarea of a cell. Each communication device and base station may have one or more radio channels open at the same time and may send signals to and/or receive signals from more than one source.

Base stations are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. In some embodiments the control apparatus may be respectively provided in each base station.

Different types of possible cells include those known as macro cells, pico cells and femto cells. For example, transmission/reception points or base stations can comprise wide area network nodes such as a macro eNode B (eNB) which may, for example, provide coverage for an entire cell or similar radio service area. A base station can also be provided by small or local radio service area network node, for example Home eNBs (HeNB), pico eNodeBs (pico-eNB), or femto nodes. Some applications utilise radio remote heads (RRH) that are connected to for example an eNB. As cells can overlap a communication device in an area can listen and transmit to more than one base station. Smaller radio service areas can be located entirely or at least partially within a larger radio service area. A communication device may thus communicate with more than one cell.

In a particular example, FIG. 1 depicts a primary cell (PCell) 100. In this example the primary cell 100 can be provided by a wide area base station 106 provided by a macro-eNB. The macro-eNB 106 transmits and receives data over the entire coverage of the cell 100. A secondary cell (SCell) 110 in this example is a pico-cell. A secondary cell can also be provided by another suitable small area network node 118 such as Home eNBs (HeNB) (femto cell) or another pico eNodeBs (pico-eNB). A yet further cell 119 is shown to be provided by a remote radio head (RRH) 120 connected to the base station apparatus of cell 100.

Base stations may communicate via each other via fixed line connection and/or air interface. The logical connection between the base station nodes can be provided for example by an X2 interface. In FIG. 1 this interface is shown by the dashed line denoted by 105.

Figure 3:
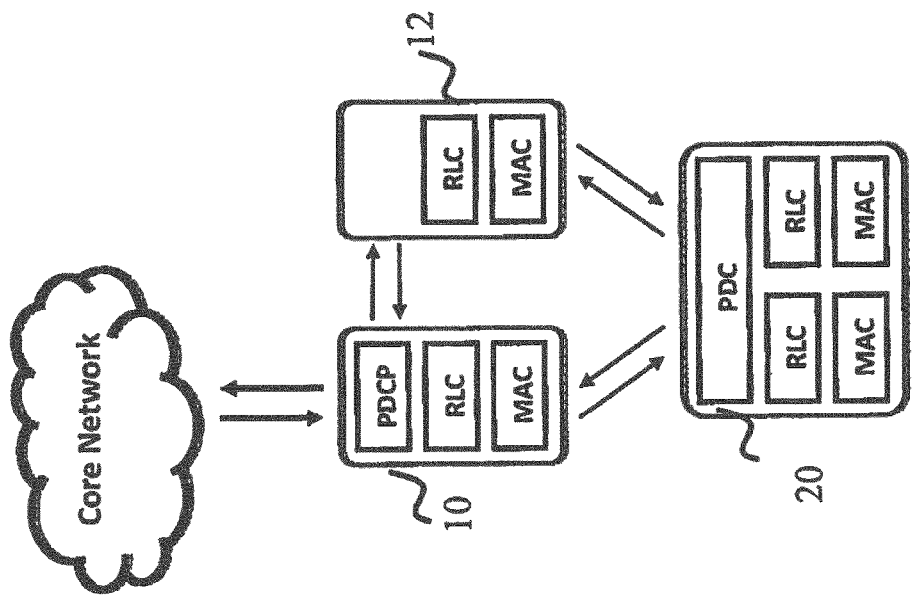
FIGS. 2 and 3 are simplified examples illustrating the principle of dual connectivity.
Figure 2:
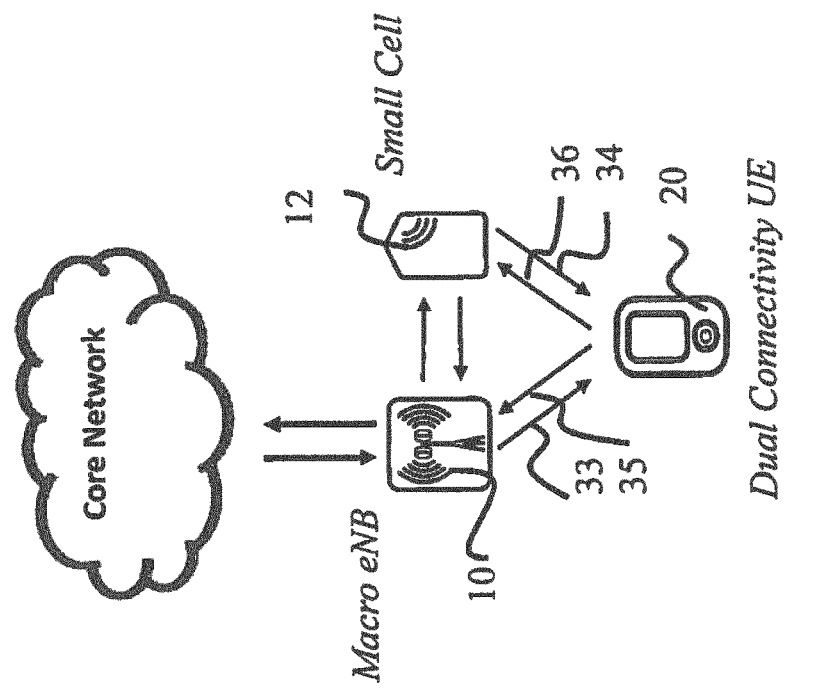

FIG. 2 shows an example for dual connectivity where a UE 20 is connected to a macro cell 10 and a small cell 12 simultaneously. A Common Packet Data Convergence Protocol (PDCP) with separated Radio Link Control (RLC) and Medium Access Control (MAC) can be used for user plane communications. The macro eNB 10 can host the Packet Data Convergence Protocol (PDCP) layer while both the macro cell and the small cell host one RLC and one MAC each. The arrangement of the layers is shown in FIG. 3. The cells also host one physical layer each beneath these layers.

In the downlink, each bearer is first split in the macro to component carriers 33 and 34 in order to go through both the macro eNB 10 and the small cell 12. Similarly in the uplink, the UE splits the bearer below PDCP to component carriers 35 and 36 and feeds RLC service data units (SDUs) to two stacks such that one RLC/MAC is for the macro cell and one RLC/MAC for the small cell. The bearer to be split can comprise a radio bearer but this is not the only option. For example, an RLC bearer can also be split between eNBs.

In FIG. 1 stations 106 and 107 are shown as connected to a core network 113 via gateway 112. A further gateway function may be provided to connect the core network to another network. The smaller stations 118 and 120 can also be connected to the network 113, for example by a separate gateway function and/or via the macro level cells. In the example, station 118 is connected via a gateway 111 whilst station 120 connects via the controller apparatus 108.

Figure 4:
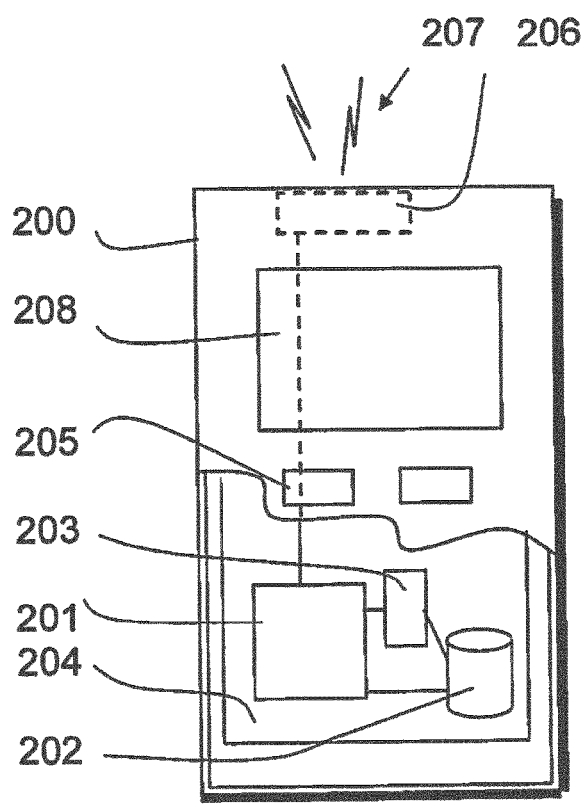
FIG. 4 shows a schematic diagram of a mobile communication device according to some embodiments.

A possible mobile communication device for transmitting to and receiving from a plurality of base stations will now be described in more detail with reference to FIG. 4 showing a schematic, partially sectioned view of a mobile communication device 200. Such a device is often referred to as user equipment (UE) or terminal. An appropriate mobile communication device may be provided by any device capable of sending radio signals to and/or receiving radio signals from multiple cells. Non-limiting examples include a mobile station (MS) such as a mobile phone or what is known as a 'smart phone', a portable computer provided with a wireless interface card, and USB stick or 'dongle' with radio, or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on.

The mobile device may receive and transmit signals over an air interface 207 with multiple base stations via an appropriate transceiver apparatus. In FIG. 4 transceiver apparatus is designated schematically by block 206. The transceiver apparatus 206 may be provided for example by means of a radio part and associated antenna arrangement. The radio part is arranged to communicate simultaneously with different stations. The radio part may also be arranged to communicate via different radio technologies. For example, the radio part can provide a plurality of different radios. The antenna arrangement may be arranged internally or externally to the mobile device.

A mobile communication device is also provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. A display 208, a speaker and a microphone can also be provided. Furthermore, a mobile communication device may comprise appropriate connectors (either wired or wireless) to other devices and/or for connecting external accessories, for example hands-free equipment, thereto.

Figure 5:
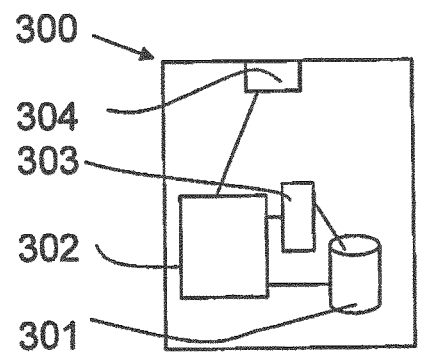
FIG. 5 shows a schematic diagram of a control apparatus according to some embodiments.

FIG. 5 shows an example of a control apparatus for a communication system, for example to be coupled to and/or for controlling a transceiver base station of a cell. The control apparatus 300 can be arranged to provide control on communications in the service area of a cell to provide the functions described below. In some embodiments a base station can comprise a separate control apparatus. In other embodiments the control apparatus can be another network element. The control apparatus 300 can be configured to provide control functions in association with configurations for dual connectivity arrangements by means of the data processing facility in accordance with certain embodiments described below. For this purpose the control apparatus comprises at least one memory 301, at least one data processing unit 302, 303 and an input/output interface 304. Via the interface the control apparatus can be coupled to a receiver and a transmitter of the base station. The control apparatus can be configured to execute an appropriate software code to provide the control functions. It shall be appreciated that similar component can be provided in a control apparatus provided elsewhere in the system for controlling configurations of secondary nodes/cells.

A wireless communication device, such as a mobile or base station, can be provided with a Multiple Input/Multiple Output (MIMO) antenna system for enabling multi-flow communications. MIMO arrangements as such are known. MIMO systems use multiple antennas at the transmitter and receiver along with advanced digital signal processing to improve link quality and capacity. More data can be received and/or sent where there are more antennae elements.

As mentioned, a communication device can receive from and/or transmit to more than one cell at a time. Use of multiple flows is utilised e.g. in techniques known as carrier aggregation (CA) and/or coordinated multipoint (COMP) transmissions. In carrier aggregation a plurality of component carriers are aggregated to increase bandwidth. An arrangement providing this is X2-based inter-site LTE carrier aggregation (CA)/coordinated multipoint (COMP). X2 is a logical interface between base stations, for example enhanced NodeBs (eNB) as shown by the dashed lines 105 in FIG. 1.

An on-going study item is named small cell enhancement (SCE). An objective of this study item is to evaluate benefits of the dual connectivity operation for UE. It has been observed that a UEs dual connectivity to MeNB and SeNB on different carriers can bring throughput gain and also mobility enhancement. With regard to the modelling of the dual connectivity, in particular from the control plane perspective, two available options are single RRC and dual RRC (radio resource control).

The inventors of the present application have identified that in the dual connectivity state there may be advantages associated with coordinating radio resource control between two RRCs on the network side. This may help prevent violation of the UE capability.

Figure 6:
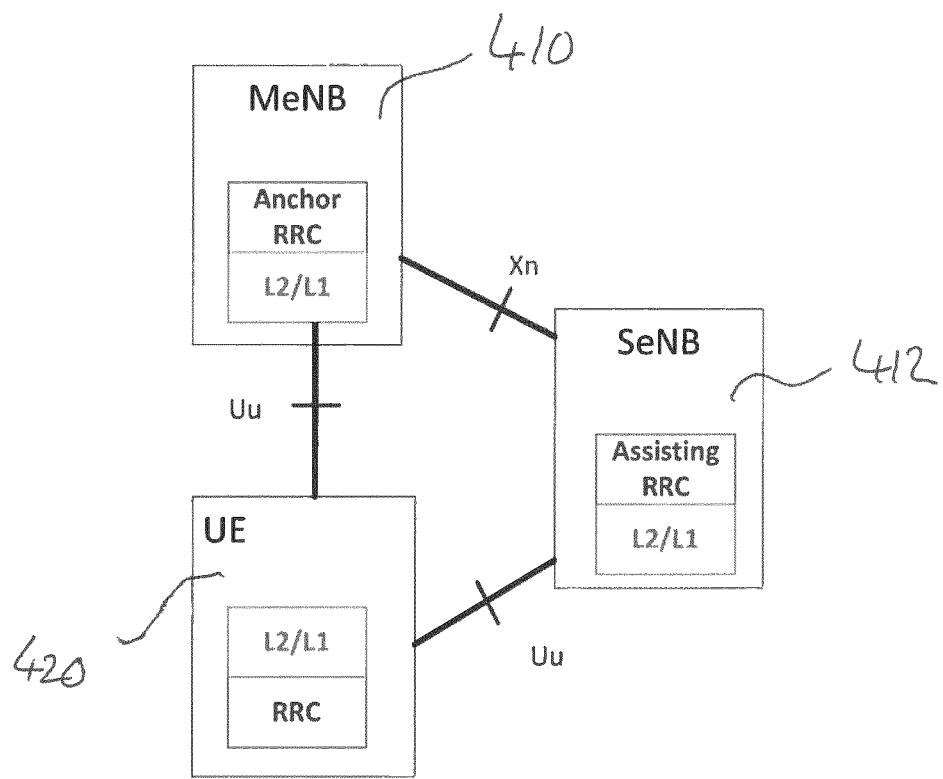
FIG. 6 shows the principle of dual connectivity according to some embodiments.

FIG. 6 shows in more detail the dual connectivity concept. A UE 420 has a radio resource control connection over Uu interfaces with MeNB 410 and SeNB 412. In this example the MeNB 410 provides an anchor RRC connection, and SeNB 412 provides an assisting RRC function. The MeNB 410 and SeNB 412 communicate over an Xn interface.

The present inventors have also identified that it may be desirable to give the SeNB 412 some RRC control over the UE 420, to provide direct and fast radio resource control from the SeNB 412 to the UE 420 by assisting RRC. However, one issue which may limit the SeNB in controlling the RRC connection with the UE is whether the SeNB can function autonomously from the MeNB 410. UE capability is one factor that may prohibit such autonomous RRC control. Accordingly, even though both RRC entities (MeNB 410 and SeNB 412) in the network side can in theory control the UE, the total radio resource configurations should not exceed the UE radio capability. This UE radio capability may include, by way of example only, supported data radio bearer (DRB) number, physical layer capability such as antenna and RF configurations, and other L2 capabilities.

One possible approach to ensure that UE capability is not exceeded is to always consult the MeNB 410 before the SeNB 412 reconfigures radio resources to the UE 420. However, this will introduce one round-trip backhaul latency and may eliminate the gain of fast radio resource control by the assisting RRC.

Accordingly some embodiments may provide a means of ensuring there is signalling between the MeNB and one or more SeNBs to ensure that any modifications to the RRC connection remain within the capabilities of the UE.

Figure 7:
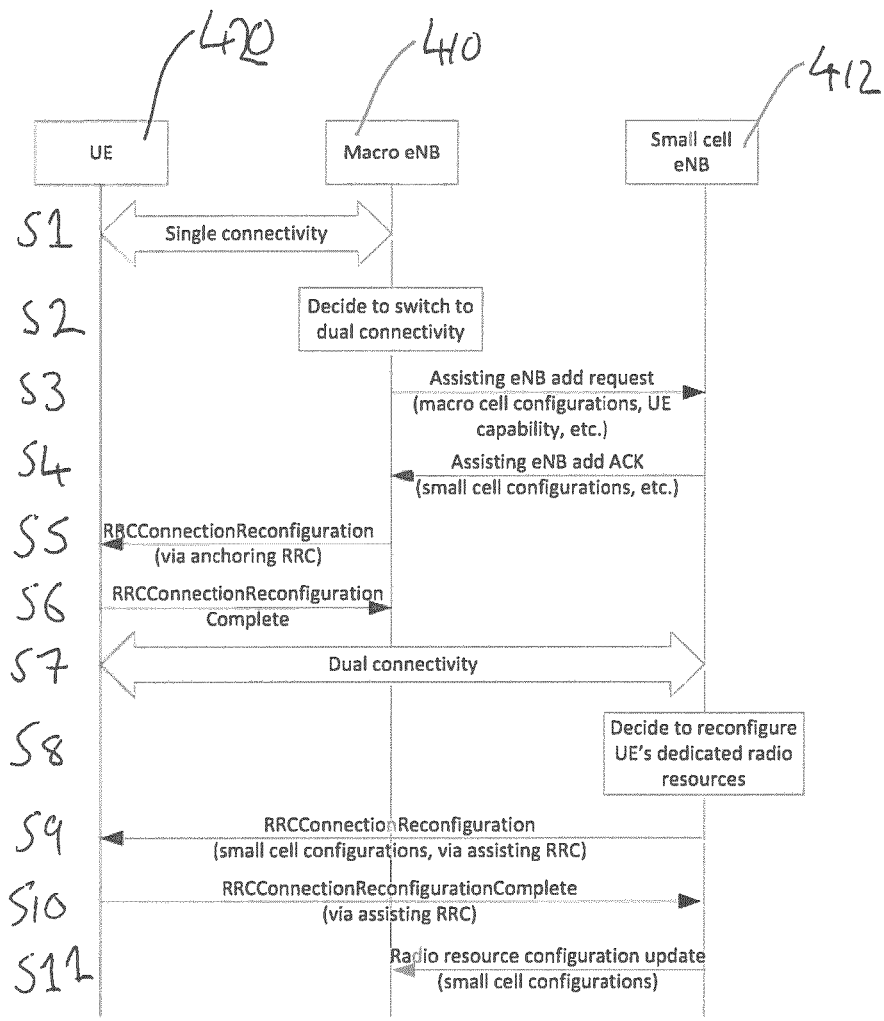
FIG. 7 is a signaling diagram according to some embodiments.

FIG. 7 shows the signalling between a UE 420, a macro eNB 410, and a small cell eNB 412 according to an embodiment.

Initially, as shown at step S1, the UE 420 is in a single connectivity state with the macro eNB 410. That is there is an RRC connection between the UE 420 and the macro eNB 410, but no RRC connection between the UE 420 and SeNB 412.

At step S2 a decision is made to switch to dual connectivity. In this embodiment the decision is made at the macro eNB 410. However this decision could also be made at the UE 420 or the small cell eNB 412. Alternatively the decision to switch to dual connectivity could also be made at a higher level network node, with a message being transmitted to the macro eNB 410 instructing it to switch the UE to a dual connectivity mode.

At step S3 a request is sent from the macro eNB 410 to the small cell eNB 412. This requests that the small cell eNB 412 enter a dual connectivity mode with the macro eNB 410. This request may also include other information such as macro cell configurations, UE capability etc. This will be discussed in more detail below.

At step S4 the small cell eNB 412 sends an "assisting eNB ACK" message to the macro eNB 410 to confirm that it can assist with the dual connectivity request. Alternatively if the SeNB 412 is unable to assist then it sends a NACK message instead.

At step S5 a message is sent from the MeNB 410 to the UE 420, informing the UE 420 of the RRC connection reconfiguration i.e. that the UE is to enter dual connectivity with the macro eNB 410 and the small cell eNB 412.

At step S6 the UE 420 sends an "RRC connection reconfiguration complete" message to the macro eNB 410 to confirm that the UE is entering the dual connection mode.

As shown at step S7 there is dual connectivity between the UE 420, the macro eNB 410 and the small cell eNB 412.

At step S8 the small cell eNB 412 makes a decision to reconfigure the UE's dedicated radio resources.

Accordingly at step S9 the SeNB 412 sends an "RRC connection reconfiguration" instruction or command to the UE 420. In this embodiment the RRC connection reconfiguration command is sent directly from the SeNB 412 to the UE 420.

At step S10 the UE 420 sends an "RRC connection reconfiguration complete" message to the SeNB 412 to confirm that it has received the message sent at step S9 and has implemented the new configuration. Again this message may be sent directly from the UE 420 to SeNB 412.

At step S11 the SeNB 412 sends a "radio resource configuration update" to the MeNB 410 to notify the MeNB 410 of the reconfiguration.

It will be appreciated that steps S8 to S10, following the setup of the dual connectivity, occur directly between the SeNB 412 and the UE 420. That is the SeNB 412 has the capability of reconfiguring the RRC connection directly i.e. without intervention from the MeNB 410. This may speed up the reconfiguration operation.

In one approach, when adding the SeNB 412 for dual connectivity, the MeNB 410 may also signal to the SeNB 412 the UE capability. The MeNB 410 may also signal information regarding the existing radio configuration to the SeNB. Using this information the SeNB 412 can determine how much UE capability remains, so that the SeNB can tailor reconfigurations accordingly. For example the SeNB can determine not to instruct a reconfiguration that would exceed a UE's capability.

The MeNB 410 may store the information regarding the UE capability in a memory of the MeNB 410. The MeNB 410 may receive updates regarding the UE capability. This information may come directly from the UE 420 or may come via another network node, such as small cell eNB 412. This information may be received periodically, or in response to a change in UE capability. It will of course be appreciated that the MeNB 410 may hold capability information regarding any number of UEs.

In some embodiments, whenever an eNB involved in dual connectivity (either an MeNB or a SeNB) configures radio resources for the UE 410, it also signals information regarding the new configurations to the other eNB so that both eNBs are aware of the latest configurations on both the macro layer and the small cell. This assists the eNBs with future reconfiguration, and helps to ensure that future reconfigurations do not exceed the UE capability whilst still maintaining the gain of fast radio resource control.

The UE 410 itself may also assist with the reconfiguration. In some embodiments the UE may indicate to the one or more eNBs that a proposed RRC configuration may exceed the UE capabilities. This indication may be in the form of a "RRC configuration reject" message, for example. In this message the UE may indicate the reason for the error (e.g. because it exceeds the UE capability), and may also indicate how much UE capability remains or will remain after the reconfiguration. The UE may send this "RRC configuration reject" message to either or both of the MeNB and SeNB. The UE may also be able to indicate its existing configurations with one or more eNBs so that another eNB that is attempting a new configuration can do so based upon knowledge of existing or "current" configurations.

It should be appreciated that a combination of UE and network side assistance may also be employed.

According to some embodiments the Xn interface between the MeNB 410 and the SeNB 412 may be enhanced to improve signalling between these two entities so they can effectively communicate information regarding UE capability. This information can be transmitted bi-directionally between these two entities. In some embodiments the "current" UE capability is stored in the MeNB 410, or is received at the MeNB 410 from a mobility management entity (MME), or any other entity.

For example, as discussed with respect to FIG. 7 above, when the MeNB 410 decides to add the small cell eNB 412 to the UE (i.e. a switch from single connectivity to dual connectivity), the MeNB 410 may signal the UE capability to the SeNB over the Xn interface along with existing radio configurations, in an XnAP message (e.g. assisting eNB add request). This UE capability transfer helps the SeNB 412 to judge whether the new radio resource configuration will exceed the UE capability.

It may also be necessary for each eNB to be aware of existing configurations that exist between the UE and other eNBs, especially on other frequency layers. Accordingly, in some embodiments an XnAP message "radio resource configuration update" may be introduced. This message may be triggered at a time when each eNB has successfully configured its radio resources to the UE, and the message may contain information regarding the successfully configured radio resources. In this regard, the MeNB may also signal the existing configurations to the small cell eNB in the initial "assisting eNB add request" XnAP message (i.e. step S3 in FIG. 7).

Accordingly each eNB may be kept up-to-date with respect to the radio resource configurations on both frequency layers, and additional latency for each eNB may be avoided when it decides to configure its own radio resources to the UE.

If a "race" condition occurs in which both MeNB 410 and SeNB 412 attempt to reconfigure the UE in such a way that the capabilities are exceeded, then the following mechanisms may be used to avoid conflicts.

According to a first mechanism priority may be given to reconfiguration commands that are received at the UE 420 from the MeNB 410 over reconfiguration commands received at the UE from the SeNB 412. This may require the UE 420 to ignore an SeNB 412 reconfiguration command exceeding the UE capability (if the MeNB reconfiguration reaches the UE first), or to revert an SeNB controlled reconfiguration and apply the MeNB controlled reconfiguration (in case the SeNB reconfiguration reaches the UE first). The UE may also indicate to the SeNB information about existing UE configurations so that it can reconfigure the UE and not exceed the UE configurations, in cases where the eNBs do not transfer this information on the Xn interface.

In a second mechanism priority may be given to whichever reconfiguration command arrives first at the UE 420. According to this mechanism the Xn signalling may carry timestamps, for instance in the form of System Frame Number (SFN). The UE 420 may then always ignore reconfiguration requests exceeding the capabilities of the UE. On the network side, the SFN may implicitly tell the MeNB 410 or the SeNB 412 the reason why the reconfiguration was ignored. The UE 420 can also indicate to the "rejected" eNB existing configurations, in case this information has not been transferred on the Xn interface.

It will thus be appreciated that embodiments may enable fast radio resource control from the small cell eNB to the UE. In accordance with embodiments of the invention this fast RRC reconfiguration may also prevent capabilities of the UE from being exceeded. Furthermore, each network node (for example MeNB and SeNB) can be kept updated on configuration information and UE capability by virtue of signalling of this information between those nodes.

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method comprising:
receiving information at an apparatus from a first node controlling a first cell;
using said information for configuration of a first radio resource control connection of said apparatus with the first node controlling the first cell, and for configuration of a second radio resource control connection of said apparatus with a second node controlling a second cell, wherein said first cell comprises a macro cell and the second cell comprises a small cell;
receiving further information from the second node;
using said further information for reconfiguration of at least the second radio resource control connection; and
transmitting, to the first node, an update regarding the reconfiguration(s),
wherein said configurations and said reconfiguration(s) are made so that dual connectivity communications between the apparatus and the first and second nodes using both the first and second radio resource control connections are performed, and a radio capability of said apparatus is not exceeded for the dual connectivity communications.

2. A method as set forth in claim 1, wherein at least one of said information or said further information comprises an instruction received from at least one of said first node or said second node to apply said configuration.

3. A method as set forth in claim 1, wherein said method comprises transmitting said radio capability of said apparatus to at least one of said first node or said second node.

4. A method as set forth in claim 1, wherein said method comprises applying said configurations and/or said reconfiguration(s) at said apparatus when it is determined that said respective configurations and/or reconfiguration(s) is/are in accordance with said radio capability of said apparatus.

5. A method as set forth in claim 1, wherein said method comprises not applying said configurations and/or said reconfiguration(s) when it is determined that said respective configurations and/or reconfiguration(s) is/are not in accordance with said radio capability of said apparatus.

6. A method as set forth in claim 1 wherein said method comprises sending a message to at least one of said first node or said second node indicating that the configurations and/or the reconfiguration(s) can not be applied as outside the radio capability of the apparatus.

7. A method as set forth in claim 1, wherein said apparatus is configured to prioritise information received from one of said first node or said second node.

8. A method as set forth in claim 1, wherein said apparatus is configured to prioritise information that is first received from either of said first and second nodes.

9. A method as set forth in claim 1, wherein said apparatus is configured to indicate said radio capability.

10. A method as set forth in claim 1, wherein said radio capability comprises at least one of physical capability or software capability of said apparatus.

11. A method as set forth in claim 1, wherein said apparatus comprises a user equipment.

12. An apparatus as set forth in claim 1, wherein said radio capability comprises at least one of:
a supported data radio bearer number,
a physical layer capability,
an antenna configuration,
a radio frequency configuration, or
an L2 capability.

13. A computer program product comprising a non-transitory computer readable medium having computer executable instructions thereon which when run on one or more processors cause an apparatus to perform:
receive information from a first node controlling a first cell;
use said information for configuration of a first radio resource control connection of said apparatus with the first node controlling the first cell, and for configuration of a second radio resource control connection of said apparatus with a second node controlling a second cell, wherein said first cell comprises a macro cell and the second cell comprises a small cell;
receive further information from the second node;
use said further information for reconfiguration of at least the second radio resource control connection; and
transmit, to the first node, an update regarding the reconfiguration(s),
wherein said configurations and said reconfiguration(s) are made so that dual connectivity communications between the apparatus and the first and second nodes using both the first and second radio resource control connections are performed, and a radio capability of said apparatus is not exceeded for the dual connectivity communications.

14. An apparatus comprising
at least one processor;
and at least one non-transitory memory including computer program code;
the at least one non-transitory memory and the computer program code configured to, with the at least one processor, cause the apparatus at least to:
receive information from a first node controlling a first cell;
use said information for configuration of a first radio resource control connection of said apparatus with the first node controlling the first cell, and for configuration of a second radio resource control connection of said apparatus with a second node controlling a second cell, wherein said first cell comprises a macro cell, and the second cell comprises a small cell;

receive further information from the second node;
use said further information for reconfiguration of at least the second radio resource control connection; and
transmit, to the first node, an update regarding the reconfiguration(s),
wherein said configurations and said reconfiguration(s) are made so that dual connectivity communications between the apparatus and the first and second nodes using both the first and second radio resource control connections are performed, and a radio capability of said apparatus is not exceeded for the dual connectivity communications.

15. An apparatus as set forth in claim 14, wherein at least one of said information or said further information comprises an instruction received from at least one of said first node or said second node to apply said configuration.

16. An apparatus as set forth in claim 14, wherein said apparatus is configured to transmit said radio capability of said apparatus to at least one of said first node or said second node.

17. An apparatus as set forth in claim 14, wherein said apparatus is configured to apply said configurations and/or said reconfiguration(s) when it is determined that said respective configurations and/or reconfiguration(s) is/are in accordance with said radio capability of said apparatus.

18. An apparatus as set forth in claim 14, wherein said apparatus is configured to not apply said configurations and/or said reconfiguration(s) when it is determined that said respective configurations and/or said reconfiguration(s) is/are not in accordance with said radio capability of said apparatus.

19. An apparatus as set forth in claim 14, wherein said apparatus is configured to send a message to at least one of said first node or said second node indicating that the configurations and/or the reconfiguration(s) cannot be applied as outside the radio capability of the apparatus.

20. An apparatus as set forth in claim 14, wherein said apparatus is configured to prioritise information received from one of said first node or said second node.

21. An apparatus as set forth in claim 14, wherein said apparatus is configured to prioritize information that is first received from either of said first and second nodes.

22. An apparatus as set forth in claim 14, wherein said apparatus is configured to indicate said radio capability.

23. An apparatus as set forth in claim 14, wherein said radio capability comprises at least one of physical capability or software capability of said apparatus.

24. An apparatus as set forth in claim 14, wherein said apparatus comprises a user equipment.

25. A method comprising:
receiving, at a first apparatus controlling a first cell, a request from a second apparatus controlling a second cell, to enter a dual connectivity mode with the second apparatus for dual connectivity communications with a user equipment, wherein said first cell comprises a small cell, and the second cell comprises a macro cell;
establishing, with the first apparatus, a radio resource control connection for performing the dual connectivity communications with the user equipment;
determining, with the first apparatus, to reconfigure the radio resource control connection;
transmitting, with the first apparatus to the user equipment, information for reconfiguration of the radio resource control connection such that a radio capability of said user equipment is not exceeded for the dual connectivity communications; and
transmitting, with the first apparatus to the second apparatus, a first message comprising one of:
an update regarding the reconfiguration, or
an indication of user equipment rejection of the reconfiguration.

26. A method as set forth in claim 25, wherein said information comprises an instruction to apply said reconfiguration.

27. A method as set forth in claim 25, wherein said method comprises receiving at said first apparatus a message indicating that said reconfiguration has been successfully applied.

28. A method as set forth in claim 25, wherein said method comprises receiving at said first apparatus a message indicating that said reconfiguration has not been applied when said reconfiguration is not in accordance with said user equipment radio capability.

29. A method as set forth in claim 25, wherein said method comprises receiving, at the first apparatus, user equipment radio capability information from said user equipment.

30. A method as set forth in claim 25, wherein said method comprises receiving, at the first apparatus, user equipment radio capability information from a mobile management entity.

31. A method as set forth in claim 25, wherein said method comprises receiving from said second apparatus information regarding said radio capability of said user equipment.

32. A method as set forth in claim 25, wherein said method comprises transmitting to said second apparatus a message indicating that said reconfiguration has been successfully applied.

33. A method as set forth in claim 25, wherein said radio capability comprises at least one of physical capability or software capability of said user equipment.

34. A method as set forth in claim 25, wherein said first apparatus comprises a base station.

35. A computer program product comprising a non-transitory computer readable medium having computer executable instructions thereon which when run on one or more processors cause an apparatus to perform:
receive at the apparatus a request from a second apparatus to enter a dual connectivity mode with the second apparatus for dual connectivity communications with a user equipment, wherein the apparatus controls a first cell and the second apparatus controls a second cell, wherein said first cell comprises a small cell, and the second cell comprises a macro cell;
establish a radio resource control connection for performing the dual connectivity communications with the user equipment;
determine to reconfigure the radio resource control connection;
transmit, to the user equipment, information for reconfiguration of the radio resource control connection such that a radio capability of said user equipment is not exceeded for the dual connectivity communications; and
transmit, to the second apparatus, a first message comprising one of:
an update regarding the reconfiguration, or
an indication of user equipment rejection of the reconfiguration.

36. An apparatus comprising
at least one processor;

and at least one non-transitory memory including computer program code;

the at least one non-transitory memory and the computer program code configured to, with the at least one processor, cause the apparatus at least to:

receive at the apparatus a request from a second apparatus to enter a dual connectivity mode with the second apparatus for dual connectivity communications with a user equipment, wherein the apparatus controls a first cell and the second apparatus controls a second cell, wherein said first cell comprises a small cell, and the second cell comprises a macro cell;

establish, with the apparatus, a radio resource control connection for performing the dual connectivity communications with the user equipment;

determine, with the first apparatus, to reconfigure the radio resource control connection;

transmit, with the apparatus to the user equipment, information for reconfiguration of the radio resource control connection such that a radio capability of said user equipment is not exceeded for the dual connectivity communications; and transmit, to the second apparatus, a first message comprising one of:
an update regarding the reconfiguration, or
an indication of user equipment rejection of the reconfiguration.

37. An apparatus as set forth in claim 36, wherein said information comprises an instruction to apply said reconfiguration.

38. An apparatus as set forth in claim 36, wherein said apparatus is configured to receive a message indicating that said reconfiguration has been successfully applied.

39. An apparatus as set forth in claim 36, wherein said apparatus is configured to receive a message indicating that said reconfiguration has not been applied when said reconfiguration is not in accordance with said user equipment radio capability.

40. An apparatus as set forth in claim 36, wherein said apparatus is configured to receive user equipment radio capability information from said user equipment.

41. An apparatus as set forth in claim 36, wherein said apparatus is configured to receive user equipment radio capability information from a mobile management entity.

42. An apparatus as set forth in claim 36, wherein said apparatus is configured to receive from said second apparatus information regarding said radio capability of said user equipment.

43. An apparatus as set forth in claim 36, wherein said radio capability comprises at least one of physical capability or software capability of said user equipment.

44. An apparatus as set forth in claim 36, wherein said apparatus comprises a base station.

* * * * *